US007453395B2

(12) United States Patent
Thomas et al.

(10) Patent No.: US 7,453,395 B2
(45) Date of Patent: Nov. 18, 2008

(54) METHODS AND SYSTEMS USING RELATIVE SENSING TO LOCATE TARGETS

(75) Inventors: Steven H. Thomas, Brooklyn Center, MN (US); Mahesh K. Jeerage, New Brighton, MN (US); Conrad Mueller, Inver Grove Heights, MN (US)

(73) Assignee: Honeywell International Inc., Morristown, NJ (US)

( * ) Notice: Subject to any disclaimer, the term of this patent is extended or adjusted under 35 U.S.C. 154(b) by 174 days.

(21) Appl. No.: 11/343,718

(22) Filed: Jan. 31, 2006

(65) Prior Publication Data
US 2007/0057840 A1 Mar. 15, 2007

Related U.S. Application Data

(60) Provisional application No. 60/689,424, filed on Jun. 10, 2005.

(51) Int. Cl.
*G01S 5/14* (2006.01)
*G01C 21/00* (2006.01)
(52) U.S. Cl. ............................. 342/357.08; 701/213
(58) Field of Classification Search ................ 701/213
See application file for complete search history.

(56) References Cited

U.S. PATENT DOCUMENTS

| 3,836,259 | A | * | 9/1974 | Partridge ................... 348/169 |
|---|---|---|---|---|
| 4,179,088 | A | | 12/1979 | French |
| 4,281,809 | A | | 8/1981 | Oglesby et al. |
| 4,488,876 | A | | 12/1984 | Thomas et al. |
| 4,949,089 | A | | 8/1990 | Ruszkowski, Jr. |
| 4,954,833 | A | | 9/1990 | Evans et al. |
| 4,988,189 | A | | 1/1991 | Kroupa et al. |
| 5,020,902 | A | | 6/1991 | Kits van Heyningen |
| 5,341,143 | A | | 8/1994 | Reis et al. |
| 5,344,105 | A | | 9/1994 | Youhanaie |
| 5,408,541 | A | | 4/1995 | Sewell |

(Continued)

FOREIGN PATENT DOCUMENTS

EP  0820040 A2  1/1998

(Continued)

OTHER PUBLICATIONS

Vcelak et al., AMR Navigation Systems and Methods of Their Calibration, Science Direct, Sensors and Actuators A, May 17, 2005, 7 pgs, Czech Technical University in Prague, Faculty of Electrical Engineering, Department of Measurement, Czech Republic.

(Continued)

*Primary Examiner*—Thomas H. Tarcza
*Assistant Examiner*—Harry Liu
(74) *Attorney, Agent, or Firm*—Fogg & Powers LLC

(57) ABSTRACT

A method for determining a position of a target is described that includes establishing a reference target position and a measuring location position and measuring a range to the target, an azimuth angle to the target, and an elevation angle to the target. The reference target position, the measuring location position, the measured range to the target, the azimuth angle to the target, and the elevation angle to the target are utilized to calculate a position of the target.

16 Claims, 3 Drawing Sheets

U.S. PATENT DOCUMENTS

| | | | |
|---|---|---|---|
| 5,528,518 A | 6/1996 | Bradshaw et al. | |
| 5,912,642 A | 6/1999 | Coffin et al. | |
| 6,064,942 A * | 5/2000 | Johnson et al. | 701/213 |
| 6,400,311 B1 | 6/2002 | Kolbli et al. | |
| 6,487,953 B1 | 12/2002 | McIngvale | |
| 6,646,603 B2 | 11/2003 | Dooley et al. | |
| 6,930,715 B1 | 8/2005 | Mower | |
| 2002/0113728 A1 | 8/2002 | Munger | |
| 2002/0140745 A1* | 10/2002 | Ellenby et al. | 345/848 |
| 2002/0180636 A1 | 12/2002 | Lin | |
| 2003/0176970 A1 | 9/2003 | Lin | |
| 2005/0021282 A1* | 1/2005 | Sammut et al. | 702/150 |
| 2006/0023204 A1 | 2/2006 | Filep | |
| 2007/0005306 A1 | 1/2007 | Foessel | |
| 2007/0010924 A1 | 1/2007 | Otani et al. | |
| 2007/0103671 A1 | 5/2007 | Ash | |

FOREIGN PATENT DOCUMENTS

| | | | |
|---|---|---|---|
| EP | 1067361 A1 | 1/2001 | |
| GB | 2300082 A | 10/1996 | |
| GB | 2394376 A | 4/2004 | |

OTHER PUBLICATIONS

EPO Communication, Dec. 6, 2006, 7 pgs.

"AN/PAQ-3 Modular Universal Laser Equipment (MULE)", Sep. 12, 1998, p. 2, Publisher: As Military Analysis Network.

"G/VLLD Laser Target Designator Basis of Issue Plan-BOIP", "http://www/fas.org/man/dod-101/sys/land/docs/bnE008AA htm", Nov. 8, 2005 p. 1, Published in: US.

"Lighweight Laser Designator Rangefinder", Jun. 9, 1999, p. 1, Publisher: IEW&S, Published in: US.

Kingslake, "Optical System Design", "Academic Press Inc". 1983, pp. 238-243, Publisher: Academic Press Incharcourt Brace Jovanovich Publishers Published in: London England.

"Laser Rangefinder/Designators", Feb. 22, 2000, p. 2, Publisher: FAS Military Analysis Network, Published in: US.

"Charge-Coupled Device", Sep. 29, 2005, pp. 5, Publisher: Wikipedia.

* cited by examiner

| PERFORMANCE SUMMARY | UNITS | MAGNETIC COMPASS SYSTEM | AMR SYSTEM |
|---|---|---|---|
| Stationary standard target size | meters | 2.3x2.3 | 2.3x2.3 |
| Designation range of std stationary target | | | |
| Day | meters | 5000 | 5000 |
| Night | meters | 2000 | 2000 |
| Direction data | | | |
| Accuracy | mils | 10 | 1 |
| Location accuracy | | | |
| Range | meters | 80 | 1m per 1Km |
| CEP | meters | 80 | 1m per 1Km |
| Laser Range finder | | | |
| Range Performance | meters | 100 to 19,995 | 100 to 19,995 |
| Range Requirement | meters | 100 to 5000 | 100 to 5000 |
| Accuracy | meters | 5 (absolute) | 0.5 (relative) |
| Azimuth/Elevation | | | |
| Azimuth | | | |
| Type | | Magnetoresitive Compass | Angular MR Sensor |
| Accuracy | mils | 13 (1 sigma) | 1 (3 sigma) |
| Accuracy reference | | Absolute | Relative |
| Elevation | | | |
| Type | | Electronic inclinometer | Angular MR Sensor |
| Accuracy | mils | 7.5 (1 sigma) | 1 (3 sigma) |
| Accuracy reference | | Absolute | Relative |

METHODS AND SYSTEMS USING RELATIVE SENSING TO LOCATE TARGETS

CROSS REFERENCE TO RELATED APPLICATIONS

This application claims priority to U.S. Provisional Application Ser. No. 60/689,424, filed Jun. 10, 2005, which is hereby incorporated by reference in its entirety.

BACKGROUND OF THE INVENTION

This invention relates generally to target locators, and more specifically, to methods and systems for incorporating relative sensing in the location of targets.

A target locator is used to remotely locate a target by measuring a range and a direction (e.g., azimuth and elevation angles) to the target. The location of the target, for example, in coordinates, is then computed based on the GPS coordinates of the position of the target locator and the range and direction. The target location is then utilized by a command and control center to guide surveillance or a weapon system to the computed location of the target.

In one known system, the target location process utilizes gyro-compassing techniques coupled with a laser range finder to obtain an absolute direction and range to the target. However, this target locator system is only suitable for large explosive weapon systems because there are some inaccuracies in the range and direction measurements. These inaccuracies result in a circular error probability (CEP) of approximately 80 meters. For lower cost and smaller explosive weapon systems, the existing target locator system does not provide the necessary target location accuracies. For these smaller explosive weapons systems, a CEP of about five meters at ranges of about five kilometers is desired.

The existing system using absolute target measurement techniques along with the gyro-compassing mechanization is not capable of meeting these higher accuracy requirements. Therefore, a different target locator mechanization is needed to meet the higher accuracies desired.

BRIEF SUMMARY OF THE INVENTION

In one aspect, a method for determining a position of a target is provided. The method comprises establishing a reference target position and a measuring location position and measuring a range to the target, an azimuth angle to the target, and an elevation angle to the target. The method further comprises utilizing the reference target position, the measuring location position, the measured range to the target, the azimuth angle to the target, and the elevation angle to the target to calculate a position of the target.

In another aspect, a target location system is provided that comprises at least one source of reference target position information and system position information, a rangefinder configured to measure a range to a reference target position and a range to the target, and a magnetic field source at a position of the target location system. The target location system further comprises a sensor configured to utilize the magnetic field source to determine azimuth angles to a reference target position and the target, an inclinometer to measure elevation angles to a reference target position and the target, and a processor. The processor is programmed to determine a position of the target using reference target position information, system position information, the measured ranges, the measured azimuth angles, and the measured elevation angle.

In still another aspect, a target location processor is provided that is programmed to calculate a range to a reference position based on a received reference position and a received measuring location position, receive a measured range to the reference position and a measured range to the target position with respect to the measuring location position, calculate a bias error using the measured range to the reference position and the measured range to the reference position, and offset a received range measurement to a target location according to the bias error.

BRIEF DESCRIPTION OF THE DRAWINGS

FIG. 5 is a chart describing a performance summary of the systems of FIGS. 1 and 3.

DETAILED DESCRIPTION OF THE INVENTION

Described are systems and methods that use relative sensing with respect to a fixed reference target along with an accurate azimuth and elevation sensor mechanization. The systems and methods provide accuracy for a target locator that is improved by as much as ten times over known target location mechanisms. The systems and methods provide circular error probability (CEP) accuracies of approaching five meters at ranges of five kilometers which results in a capability of using low cost, small explosive weapon systems to engage such targets.

The target locator utilizes relative sensing to accurately determine the position of the target. A method performed by the target locating system includes establishing a reference target position, for example, using a GPS determination and assuming that any GPS errors are the same at both the reference location and the measuring location position, which allows cancellation of the GPS errors. A range measurement between the present location and the reference target is computed and compared to the range as measured by a range finder to establish a rangefinder bias error to be used as an offset when determining the range to the target location. The system, in one embodiment, incorporates an anisotropic magneto-resistive (AMR) sensor to measure an angular position of the target.

Known target locator systems are used to determine absolute range, azimuth, and elevation measurements from a remote position to a designated target. In at least one of these target locator systems, a laser rangefinder is used to measure range to the target, a magneto-resistive compass sensor that senses earth's magnetic field is used for azimuth location, and an inclinometer is used to determine elevation.

Figure 1:
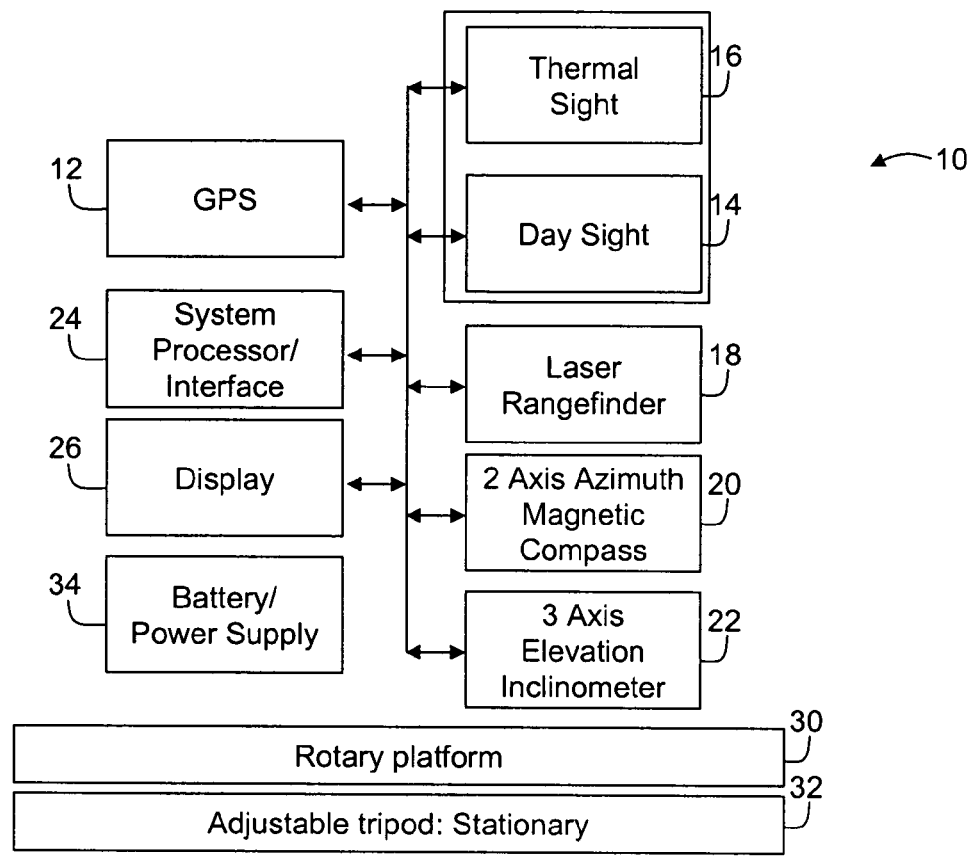
FIG. 1 is a block diagram of a target locating system.

FIG. 1 is a block diagram of the known target locator system 10. GPS 12 provides a target locator position $x_p$, $y_p$, and $z_p$. The sights, specifically, a day operation sight 14 or a night operation (i.e. thermal) sight, each contain a reticle that is used to accurately align laser rangefinder 18, magnetic compass 20, and inclinometer 22 to the target. The above described components of system 10 are controlled by and provide data to system processor/interface 24 which provides data to display 26 where it can be viewed by an operator of system 10. System 10 includes a rotary platform 30 on which the above described components are mounted, and rotary platform 30 is attached to a stationary, adjustable tripod 32. All components of system 10 that utilize power are supplied that power from battery/power supply 34.

Range to the target is determined using laser rangefinder 18. An azimuth angle to the target is measured from magnetic north by magnetic compass 20, and elevation angle to the target is measured using inclinometer 22. Because the azimuth sensor (e.g., magnetic compass 20) measures angles referenced to magnetic north (i.e. earth magnetic field strength <1 gauss), it is prone to variability and inaccuracies. The earth's magnetic field is relatively weak and also varies as a function of earth position. Other magnetic disturbances in close proximity also can affect operation of magnetic compass 20.

Figure 2:
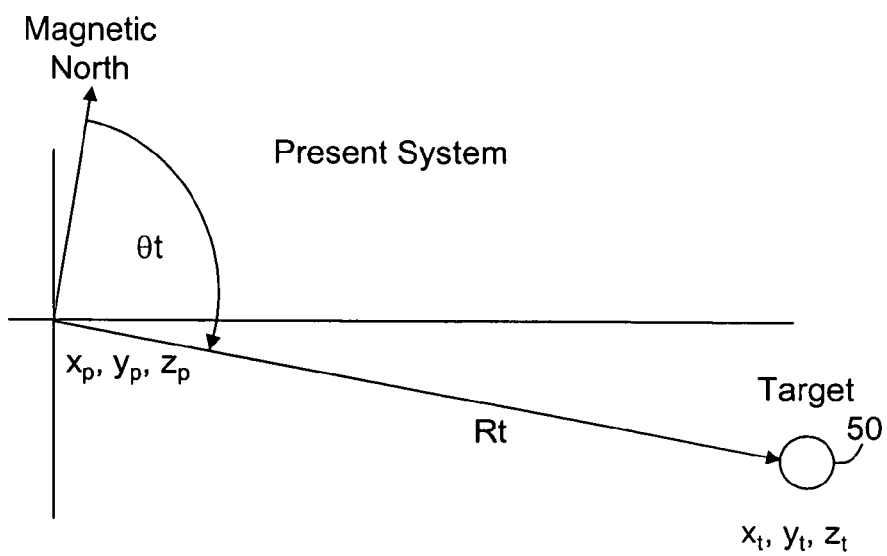
FIG. 2 illustrates determination of the target location by the system of FIG. 1 using a magnetic compass.

Further complicating utilization of system 10 is that magnetic compass 20 requires a precision calibration in the field after system 10 is set up. Even with this calibration process, an accuracy of about only about ten millirads can be achieved. With a target at a range of 5000 meters, an azimuth uncertainty of ten millirads results in a position uncertainty of about fifty meters. Inclinometer 22 also is not capable of meeting high accuracy requirements as its accuracy is, for example, only about seven and a half millirads. FIG. 2 illustrates the target positioning mechanization incorporated within system 10 where a range to the target 50 is determined utilizing magnetic north as determined by magnetic compass 20.

To provide more accurate targeting, the mechanization of system 10 is changed to determine a relative direction to a target (e.g., relative to the direction to a fixed reference target) and further to utilize knowledge of the reference target position and the direction to it to compute an actual position of the target. The utilization of a more accurate relative direction (e.g., in azimuth and elevation) for the sensor mechanization results in improved azimuth and elevation accuracies for the target.

Figure 3:
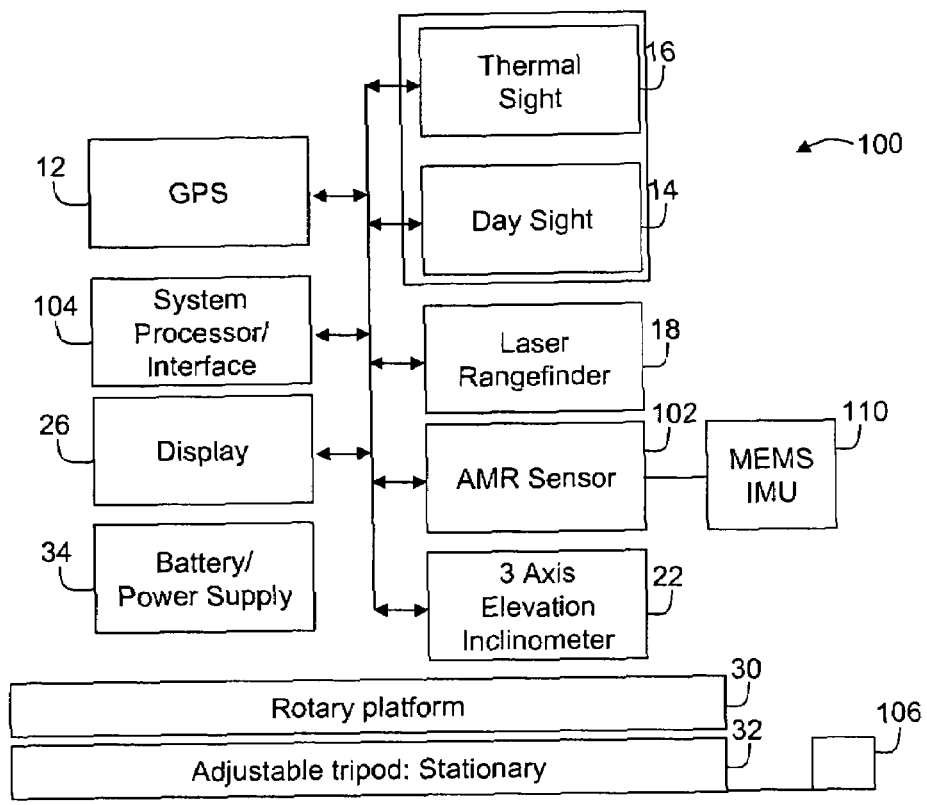
FIG. 3 is a block diagram of a system configured to utilize relative sensing to determine target location that incorporates an anisotropic magneto-resistive sensor.

FIG. 3 is a diagram of a system 100 configured to utilize relative sensing to determine target positions. Components of system 100 which are the same as components of system 10 (shown in FIG. 1) are denoted utilizing the same reference numerals. As further described below, system 100 incorporates a anisotropic magneto-resistive (AMR) sensor 102 rather than magnetic compass 20 (shown in FIG. 1) and the system/processor interface 104 is necessarily updated to support the incorporation of AMR sensor 102. A magnet 106 is mounted on tripod 32 for operation of sensor 102.

Relative Sensing

To find the position of the target, a range to the target, Rt, is determined, as well as the azimuth angle to the target, θt, and elevation angle to the target, φt. Relative sensing uses a surveyed reference target position that minimizes or eliminates common mode or bias errors found in present target positioning solutions. By using a low cost Inertial Measurement Unit (IMU) for accurate elevation measurements, it can also measure accurately, for a short period of time, azimuth angles. As a result, the IMU can be used to test or calibrate the AMR azimuth sensing. Relative sensing of target positions includes relative GPS measurements, relative azimuth measurements, and relative elevation measurements.

Figure 4:
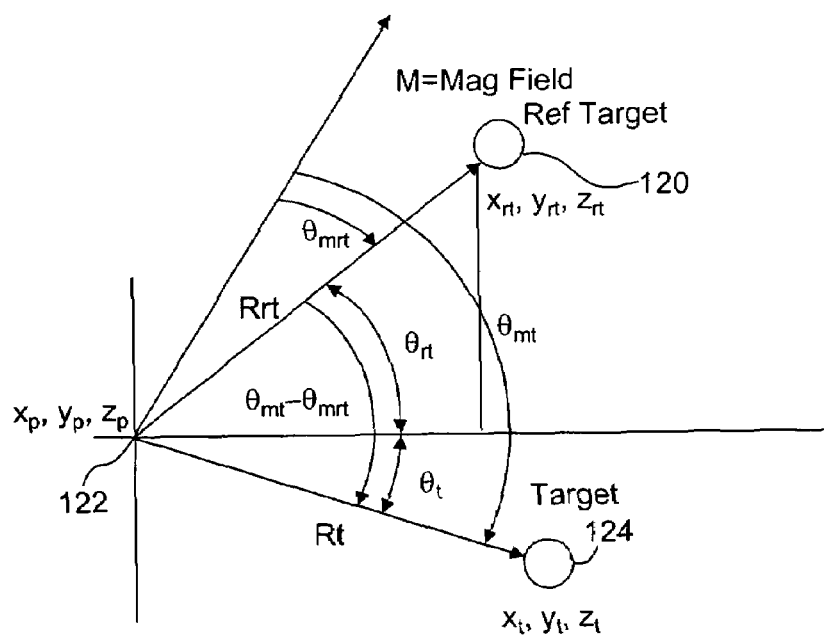
FIG. 4 illustrates determination of target location utilizing a reference target location and the system of FIG. 3.

More specifically, and referring now to FIG. 4, relative sensing is accomplished by establishing a reference target position that is located in less-hostile areas. Reference target position 120 (e.g., $x_{rt}$, $y_{rt}$, $z_{rt}$) is measured either while on the way to a measuring location position 120 ($x_p$, $y_p$, $z_p$) or by a person traveling to a reference target and taking a reference GPS reading. Other methods of providing reference target position, including GPS determination, are contemplated.

FIG. 4 is an operational diagram illustrative of relative sensing. If the GPS "surveyed" positions are highly accurate, then the reference target location 120 can be selected to be closer to the measuring position 122 ($x_p$, $y_p$, $z_p$). Therefore, the range, Rrt, to the reference target 120 can be relative small (i.e. 200 to 500 meters). If the GPS "surveyed" positions have moderate errors (i.e. 1 to 2 meters), then the location of the reference target should be approximately the same distance as the actual target 124 to minimize errors resulting from "survey" errors.

By assuming that the relative GPS errors are small, and that either the same GPS receiver (e.g., GPS 12) or another GPS receiver with similar error characteristics is used, and the measurement time between the two points 122 and 120 ($x_p$, $y_p$, $z_p$ and $x_{rt}$, $y_{rt}$, $z_{rt}$) is small (i.e., the GPS satellite positions are similar), the error at both these locations is then related and as a result, most of the GPS errors will be cancelled resulting in the relative position of the reference target 120 to the measurement location 122 being very accurate.

Range Measurement

By assuming positions $x_p$, $y_p$, $z_p$ and $x_{rt}$, $y_{rt}$, $z_{rt}$ are accurately "surveyed" using GPS, then exact range, Rrt, between these two points can be computed to establish range truth. Using laser rangefinder 18 (shown in FIG. 3), range, Rrt, can be measured and compared against the range truth. A laser rangefinder bias error is then determined and used as a bias error offset when the actual target range, Rt, is measured. As a result, the range to the target 124 can be measured very accurately, for example, to within one-half meter.

Azimuth and Elevation Measurements

Instead of using a magnetic compass sensor (e.g., magnetic compass 20 (shown in FIG. 1) as does system 10, system 100 incorporates a non-contact, high resolution anisotropic magneto-resistive (AMR) sensor 102 that is utilized to measure an angular position. AMR sensors are very accurate, reliable, and provide long life. As such, sensor 102 is capable of measuring the angle direction of a magnetic field from a self-contained magnet with less than 0.05 degree resolution.

The advantages of measuring field direction versus field strength (i.e. like magnetic compass 20) include: an insensitivity to the temperature coefficient of the magnet, less sensitivity to shock and vibration, and the ability to withstand large variations in the gap between the sensor and magnet. In one embodiment, a magnet 106 for sensor 102 is located on stationary tripod section 32 and AMR sensor is aligned and then rotated with the optical sights 14 and 16 and laser rangefinder 18.

The field strength from magnet 106 at sensor 102 is 100 times the strength of the earth's magnetic field and as a result, is more stable and less susceptible to perturbations from outside environments. The field direction is not critical since relative angular positions are measured rather than absolute angular positions. As a result, there is minimal calibration of the AMR sensor mechanization in the field. In one embodiment, output is from a Wheatstone bridge (not shown) that permits balanced output signals for noise immunity. A low offset amplifier and high resolution delta-sigma converter (i.e. an analog to digital converter) is utilized to meet the accuracy of ±0.05 degree.

In one embodiment, an operational scenario for using system 100 is that the sight reticle (14, 16) is moved to align with reference target 120. The angle between the magnetic field and the reference target 120 is then measured (θmrt). The sight reticle is then moved to the target and the angle between the magnetic field and the target is measured (θmt). Subtracting one angle from the other results in the angle between the reference target and the actual target (θmt−θmrt). The angle θrt is calculated knowing the reference target position. As a result, the target azimuth angle (θt) can be determined. Because of the high accuracy and resolution of the angular position sensor, θt can be measured to an accuracy of ±0.05 degrees or 0.87 milliradians.

In-Field Calibration and Integrity of the AMR Sensor

AMR sensors 102 provide relative target direction (relative to a fixed reference target). The AMR sensor's capability to measure relative target direction can be enhanced with a low cost Micro-Electro Mechanical Systems Inertial Measurement Unit 110 (MEMS IMU) to accurately calibrate AMR sensors 102 in the field prior to its use in system 100 if necessary. In addition, MEMS IMU 110 can also be used to determine the integrity of the directional information from AMR sesnor 102 with a high level of confidence.

While the invention has been described in terms of various specific embodiments, those skilled in the art will recognize that the invention can be practiced with modification within the spirit and scope of the claims.

What is claimed is:

1. A method for determining a position of a target comprising:
    establishing a reference target position and a measuring location position;
    supplying a magnetic field from a magnet positioned at the measuring location position of a target location system, the strength of the supplied magnetic field being greater than the strength of the earth's magnetic field;
    measuring a range to the target, an angle between the target and the supplied magnetic field, and an elevation angle to the target; and
    utilizing the reference target position, the measuring location position, the measured range to the target, the angle between the target and the supplied magnetic field, and the elevation angle to the target to calculate a position of the target.

2. A method according to claim 1 wherein establishing a reference target position further comprises determining at least one of a reference target position and a measuring location position utilizing GPS.

3. A method according to claim 1 wherein measuring a range to a target further comprises:
    calculating a range to the reference target position based on the reference target position and the measuring location position;
    measuring a first range, the first range being the range to the reference target position from the measuring location position;
    establishing a range finder bias error using the measurement and calculation;
    measuring a second range, the second range being the range to the target position from the measuring location position; and
    offsetting the second range according to the rangefinder bias error.

4. A method according to claim 1 wherein determining an azimuth angle to the target comprises determining the azimuth angle to the target utilizing an anistropic magneto-resistive sensor.

5. A method according to claim 4, wherein determining the azimuth angle to the target utilizing an anistropic magneto-resistive sensor comprises:
    aligning a reticle of the sensor with the reference target;
    measuring a first angle between the supplied magnetic field and the reference target;
    aligning the reticle of the sensor with the target;
    measuring a second angle between the supplied magnetic field and the target;
    subtracting the first angle from the second angle to determine the angle between the reference target and the actual target;
    calculating the azimuth angle of the reference target position based on the reference target position and the measuring location position; and
    determining the azimuth angle to the target based on the angle between the reference target and the actual target and the azimuth angle of the reference target position.

6. A method in accordance with claim 1 wherein measuring an elevation angle to the target comprises determining the elevation angle with an inclinometer.

7. A method according to claim 1 wherein:
    establishing a reference target position further comprises determining at least one of a reference target position and a measuring location position utilizing GPS; and
    utilizing the reference target position and the measuring location position comprises assuming that any GPS position measurement errors are the same at both the reference target position and the measuring location position.

8. A target location system comprising:
    at least one source of reference target position information and measuring location position information;
    a rangefinder configured to measure a range to a reference target position and a range to the target;
    a magnetic field source positioned at a measuring location position of said system, wherein the strength of the magnetic field from the magnetic field source is greater than the strength of the earth's magnetic field;
    a sensor configured to utilize said magnetic field source to determine an azimuth angle to the target, based on measurements of angles between the magnetic field source and the reference target and between the magnetic field source and the target;
    an inclinometer to measure elevation angles to a reference target position and the target; and
    a processor programmed to determine a position of the target using reference target position information, measuring location position information, the measured ranges, the determined azimuth angle, and the measured elevation angle.

9. A target location system according to claim 8 further comprising a thermal sight having a reticle, said thermal sight configurable to align said range finder, said sensor, and said inclinometer.

10. A target location system according to claim 8 further comprising a day sight having a reticle, said day sight configurable to align said range finder, said sensor, and said inclinometer.

11. A target location system according to claim 8 wherein to determine a position of a target, said processor is configured to:
    calculate a range to the reference target position based on the reference target position and the measuring location position;
    receive a measured range to the reference target position and the target position with respect to the measuring location position from said range finder;
    calculate a range finder bias error using the measured range and calculated range; and
    offset the range measurement to the target location according to the range finder bias error.

12. A target location system according to claim 8 wherein sensor comprises an anistropic magneto-resistive sensor.

13. A target location system according to claim 8 further comprising an inertial measurement unit (IMU) coupled to said processor, said processor programmed to utilize data from said IMU to calibrate said anistropic magneto-resistive sensor.

14. A target location processor programmed to:
   calculate a range to a reference position based on a received reference position and a received measuring location position;
   receive a measured range to the reference position and a measured range to the target position with respect to the measuring location position;
   calculate a bias error using the calculated range to the reference position and the measured range to the reference position;
   offset a received range measurement to a target location according to the bias error;
   receive a measured angle between the reference target and a magnetic field, the magnetic field being supplied by a magnet positioned at a measuring location position of a target location system, the strength of the supplied magnetic field being greater than the strength of the earth's magnetic field; and
   receive a measured angle between the target and the supplied magnetic field.

15. A target location processor according to claim 14, said processor farther programmed to:
   determine a target position based on the received reference position, the received measuring location position, the received range measurements, the received measured angles, a calculated azimuth angle to the reference target, and a received elevation angle to the target position.

16. A method according to claim 1, further comprising determining an azimuth angle to the target.

* * * * *